US007853663B2

(12) United States Patent
Hoerl et al.

(10) Patent No.: US 7,853,663 B2
(45) Date of Patent: Dec. 14, 2010

(54) WIRELESS MANAGEMENT SYSTEM FOR CONTROL OF REMOTE DEVICES

(75) Inventors: David Hoerl, Bridgewater, NJ (US); Izzy Leibovich, West Orange, NJ (US); Paul Newman, Montclair, NJ (US); Martin McGinnis, Larne (GB)

(73) Assignee: RIIP, Inc., Wilmington, DE (US)

( * ) Notice: Subject to any disclaimer, the term of this patent is extended or adjusted under 35 U.S.C. 154(b) by 1288 days.

(21) Appl. No.: 11/102,450

(22) Filed: Apr. 4, 2005

(65) Prior Publication Data
US 2006/0285514 A1    Dec. 21, 2006

Related U.S. Application Data

(63) Continuation-in-part of application No. 10/799,349, filed on Mar. 12, 2004.

(51) Int. Cl.
*G06F 15/16* (2006.01)
(52) U.S. Cl. ........................................ 709/208; 709/246
(58) Field of Classification Search ................. 709/208, 709/246; 348/143, 153, 156, 159, 207.1, 348/207.11, 211.99, 211.2, 211.8, 211.11, 348/211.13
See application file for complete search history.

(56) References Cited

U.S. PATENT DOCUMENTS

| | | | |
|---|---|---|---|
| 4,698,672 A | 10/1987 | Chen et al. |
| 4,771,865 A | 9/1988 | Hinderling |
| 5,008,747 A | 4/1991 | Carr et al. |
| 5,483,634 A | 1/1996 | Hasegawa |
| 5,552,832 A | 9/1996 | Astle |
| 5,576,845 A | 11/1996 | Komatsu |
| 5,721,842 A | 2/1998 | Beasley et al. |
| 5,732,212 A | 3/1998 | Perholtz et al. |
| 5,742,274 A | 4/1998 | Henry et al. |
| 5,757,424 A | 5/1998 | Frederick |
| 5,767,897 A | 6/1998 | Howell |
| 5,802,213 A | 9/1998 | Gardos |
| 5,821,986 A | 10/1998 | Yuan et al. |
| 5,861,960 A | 1/1999 | Suzuki et al. |
| 5,884,096 A | 3/1999 | Beasley et al. |
| 5,937,176 A | 8/1999 | Beasley et al. |
| 6,016,166 A | 1/2000 | Huang et al. |
| 6,091,857 A | 7/2000 | Shaw et al. |
| 6,112,264 A | 8/2000 | Beasley et al. |
| 6,167,432 A | 12/2000 | Jiang |

(Continued)

OTHER PUBLICATIONS

International Search Report for PCT/US06/12280, Mar. 14, 2007.

(Continued)

*Primary Examiner*—Patrice L Winder
*Assistant Examiner*—Minh-Chau Nguyen

(57) ABSTRACT

The present invention discloses a wireless remote device management system for wirelessly interfacing a plurality of remote devices (e.g., computers, servers, etc.) with one or more user workstations. Each remote device is coupled to a wireless transceiver. The user workstations may include a wireless user station coupled to a keyboard, a video monitor, and a cursor control device. Preferably the transceivers and wireless user stations use an 802.11 compatible network for communication. Additionally, a wireless access point may be utilized for centralized communications between the transceivers and user workstations. The present invention also enables the transceivers and wireless user workstations to communicate directly without the need for any additional hardware.

19 Claims, 7 Drawing Sheets

U.S. PATENT DOCUMENTS

| | | | |
|---|---|---|---|
| 6,173,082 | B1 | 1/2001 | Ishida et al. |
| 6,263,365 | B1 | 7/2001 | Scherpbier |
| 6,289,378 | B1 | 9/2001 | Meyer et al. |
| 6,304,895 | B1 | 10/2001 | Schneider et al. |
| 6,330,595 | B1 | 12/2001 | Ullman et al. |
| 6,333,750 | B1 | 12/2001 | Odryna et al. |
| 6,343,313 | B1 | 1/2002 | Salesky et al. |
| 6,345,323 | B1 | 2/2002 | Beasley et al. |
| 6,363,062 | B1 | 3/2002 | Aaronson et al. |
| 6,373,850 | B1 | 4/2002 | Lecourtier et al. |
| 6,388,658 | B1 | 5/2002 | Ahern et al. |
| 6,408,334 | B1 | 6/2002 | Bassman et al. |
| 6,445,818 | B1 | 9/2002 | Kim |
| 6,532,218 | B1 | 3/2003 | Shaffer et al. |
| 6,535,983 | B1 | 3/2003 | McCormack |
| 6,539,418 | B2 | 3/2003 | Schneider et al. |
| 6,564,380 | B1 * | 5/2003 | Murphy .................. 725/86 |
| 6,567,813 | B1 | 5/2003 | Zhu et al. |
| 6,567,869 | B2 | 5/2003 | Shirley |
| 6,571,016 | B1 | 5/2003 | Mehrotra et al. |
| 6,621,413 | B1 | 9/2003 | Roman et al. |
| 6,622,018 | B1 | 9/2003 | Erekson |
| 6,664,969 | B1 | 12/2003 | Emerson |
| 6,675,174 | B1 | 1/2004 | Bolle |
| 6,701,380 | B2 | 3/2004 | Schneider et al. |
| 6,728,753 | B1 | 4/2004 | Parasnis et al. |
| 6,771,213 | B2 | 8/2004 | Durst |
| 6,772,169 | B2 | 8/2004 | Kaplan |
| 6,850,502 | B1 | 2/2005 | Kagan et al. |
| 6,952,495 | B1 | 10/2005 | Lee |
| 7,024,474 | B2 * | 4/2006 | Clubb et al. .............. 709/223 |
| 7,042,587 | B2 | 5/2006 | Fiske |
| 7,099,934 | B1 | 8/2006 | Ewing et al. |
| 7,117,266 | B2 | 10/2006 | Fishman et al. |
| 7,249,167 | B1 | 7/2007 | Liaw |
| 7,260,624 | B2 | 8/2007 | Sivertsen |
| 7,382,397 | B2 * | 6/2008 | Mottur .................. 348/142 |
| 7,576,770 | B2 * | 8/2009 | Metzger et al. ........... 348/143 |
| 2002/0038334 | A1 | 3/2002 | Schneider et al. |
| 2002/0095594 | A1 * | 7/2002 | Dellmo et al. ............ 713/200 |
| 2002/0147840 | A1 | 10/2002 | Mutton et al. |
| 2003/0017826 | A1 | 1/2003 | Fishman et al. |
| 2003/0030660 | A1 | 2/2003 | Dischert |
| 2003/0037130 | A1 | 2/2003 | Rollins |
| 2003/0088655 | A1 * | 5/2003 | Leigh et al. ............... 709/223 |
| 2003/0092437 | A1 | 5/2003 | Nowlin |
| 2003/0112467 | A1 | 6/2003 | McCollum et al. |
| 2003/0135656 | A1 | 7/2003 | Schneider |
| 2003/0191878 | A1 * | 10/2003 | Shirley .................. 710/100 |
| 2003/0217123 | A1 | 11/2003 | Anderson |
| 2004/0015980 | A1 * | 1/2004 | Rowen et al. ............. 719/310 |
| 2004/0045030 | A1 | 3/2004 | Reynolds et al. |
| 2004/0062305 | A1 | 4/2004 | Dambrackas |
| 2004/0093401 | A1 | 5/2004 | Buswell et al. |
| 2004/0117426 | A1 | 6/2004 | Rudkin |
| 2004/0249953 | A1 | 12/2004 | Fernandez |
| 2005/0018766 | A1 * | 1/2005 | Iwamura ............... 375/240.01 |
| 2005/0027890 | A1 | 2/2005 | Nelson |
| 2005/0030377 | A1 | 2/2005 | Li |
| 2005/0094577 | A1 | 5/2005 | Ashwood-Smith |
| 2005/0114894 | A1 | 5/2005 | Hoerl |
| 2005/0125519 | A1 | 6/2005 | Yang |
| 2005/0132403 | A1 * | 6/2005 | Lee et al. ................. 725/38 |
| 2005/0195775 | A1 * | 9/2005 | Petite et al. ............. 370/338 |
| 2006/0095539 | A1 | 5/2006 | Renkis |

OTHER PUBLICATIONS

The International Search Report and Written Opinion for PCT/US04/29899 dated Aug. 31, 2006.

The International Search Report and Written Opinion for PCT/US05/40948 dated Jul. 20, 2006.

The International Search Report and Written Opinion for PCT/US05/07684 dated Sep. 25, 2007.

The International Search Report and Written Opinion for PCT/US06/12280 dated Mar. 14, 2007.

The International Search Report and Written Opinion for PCT/US05/25275 dated May 11, 2006.

Yueh-Feng Lee, A Configurable Java Architecture for Mobile Terminal Software Download, Wireless Communications Conference, WCNC2002 IEEE, 17-21 03/02, vol. 1, abstract.

The International Search Report and Written Opinion by the International Searching Authority, issued on Sep. 19, 2007, in the PCT application No. PCT/US06/38567, which corresponds to U.S. Appl. No. 11/241,845.

The Office Actions issued in U.S. Appl. No. 10/666,940.

The Office Action issued in U.S. Appl. No. 10/898,001.

The Office Action issued in U.S. Appl. No. 10/988,184.

The Office Actions issued in U.S. Appl. No. 10/799,349.

Adder, Products Brochure, APX 304572-304579, Apr. 1, 1998, 8 pages.

AdderViewOSD, Products Brochure, RCI 173246-173279, Aug. 1, 2002.

Avocent's Pre-Markman Hearing Memorandum in Support of its Proposed Claim Constructions (Dec. 15, 2004).

Avocent Redmond's Answering Pre-Markman Hearing Briefing (Jan. 18, 2005).

Avocent Redmond's Supplemental Responses to Raritan's Second Set of Post-Remand Interrogatories (Nos. 15R-17R), Mar. 14, 2005.

Apex, OutLook User Guide, 1997.

Apex et al., Products Brochure, APX 082949-082971, 1996.

Apex PC Solutions, Users Guide, 1993.

Apex, Products Brochure, APX 018983-018996, Jan. 7, 1997.

Apex, Products Brochure, APX 019103-019121, 1995-1996.

Apex, Products Brochure, APx 056304-056346, Oct. 1, 1998.

Apex et al, Products Brochure, APX 316564-316621.

Apex et al, Products Brochure, APX 316848-316909.

Apex et al, Products Brochure, APX 316910-316969.

Apex's Sales Brochure, Sep. 1, 1998, 1 page.

Apex, SwitchBack User Guide, 1995.

Apex's Motion on the PolyCon Catalog and Supporting Memorandum, Jan. 15, 2002.

Apex's Proposed Markman Findings, Jan. 25, 2002.

Appendix1 to Apex's Proposed Markman Findings, Jan. 25, 2002.

Badman, Switching into High Gear, Network Computing, Apr. 30, 2001.

Belkin, The OmniView PRO User Manual, Jul. 16, 2001.

Bruce McNair Deposition Transcript, Case No. 01-CV-4435, May 5, 2005.

Compaq, White papers, 1996, APX 083313-APX 083326, APX 083335-APX 083389.

Ching-I Hsu Deposition Transcript, Case No. 01-CV-4435, Mar. 11, 2005.

Cybex, Director Installer/User Guide, Nov. 1996.

Cybex, 4 x P & 1 x P KVM Switches Guide to Applications, 1996.

Datavision, Product Brochure, 1992, 3 pages.

Declaration of Joseph C. McAlexander in Support of Apex's Motion for a Preliminary Injunction, Sep. 17, 2001.

Declaration of Joseph C. McAlexander, III in the Civil Action No. 01-CV-4435, Dec. 15, 2004.

Declaration of Sharad Malik, Ph. D., Jan. 8, 2002.

Declaration of Sharad Malik, Ph.D. (Jan. 18, 2005).

Defendant Raritan Computer Inc.'s Claim Construction Statement (Dec. 15, 2004).

Defendant Raritan Computer Inc.'s Motion for Partial Summary Judgment (Jan. 8, 2002).

Defendant Raritan Computer Inc.'s Proposed Findings of Fact and Conclusions of Law, Apr. 27, 2005.

Defendant Raritan Computer Inc.'s Reply to Avocent's Proposed Claim Constructions (Jan. 18, 2005).

Defendant Raritan Computer Inc.'s Reply to Avocent's Proposed Claim Constructions (Jan. 8, 2005).

Defendant Raritan Computer, Inc.'s Response to Plaintiffs Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiffs First Set of Interrogatories (Nos. 9-12), Aug. 31, 2001.
Defendant Raritan Computer, Inc.'s Supplemental Response to Plaintiffs Second Set of Interrogatories (Nos. 9-12), Dec. 12, 2001.
Dei, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
Trial Transcript, *Apex v. Raritan*, Southern District of New York, Case No. 01-CV-4435, vol. 7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition Transcript, Case No. 01-CV-4435, Dec. 6, 2001.
The list of docket reports in the litigation: *Avocent Redmond Corp. v. Raritan Computer, Inc.*, Civil Action No. 1:01-CV-04435(PKC), United States District Court for the Southern District of New York.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, Jun. 14, 2004.
Findings and Conclusions, *Apex v. Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent v. Raritan*, Civil Action No. 4435, Feb. 3, 2005.
Marksman Transcript, *Avocent v. Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex v. Raritan*, Southern District of New York, Case No. 01-CV-4435, vol. 1, Jan. 2002.
Trial Transcript, *Apex v. Raritan*, Southern District of New York, Case No. 01-CV-4435, vol. 2, Jan. 2002.
Trial Transcript, *Apex v. Raritan*, Southern District of New York, Case No. 01-CV-4435, vol. 3, Jan. 2002.
Trial Transcript, *Apex v. Raritan*, Southern District of New York, Case No. 01-CV-4435, vol. 4, Jan. 2002.
Trial Transcript, *Apex v. Raritan*, Southern District of New York, Case No. 01-CV-4435, vol. 5, Jan. 2002.
Trial Transcript, *Apex v. Raritan*, Southern District of New York, Case No. 01-CV-4435, vol. 6, Jan. 2002.

* cited by examiner

WIRELESS MANAGEMENT SYSTEM FOR CONTROL OF REMOTE DEVICES

CROSS-REFERENCE TO RELATED APPLICATIONS

This application is a continuation-in-part application of U.S. patent application Ser. No. 10/799,349, which was filed on Mar. 12, 2004.

FIELD OF THE INVENTION

The present invention relates generally to the field of keyboard, video, and mouse ("KVM") over Internet Protocol ("IP") ("KVMoIP"). In particular, the present invention relates to a non-intrusive solution for accessing and controlling remote devices, such as critical server systems, preferably via a wireless fidelity ("WiFi") connection. The present invention captures and converts keyboard and cursor control device signals from a local user workstation and transmits the converted signals to a selected remote device. Further, the present invention captures, digitizes, and compresses video from the selected remote device and transmits it with keyboard and cursor control device signals from the remote device to a local user workstation.

BACKGROUND OF THE INVENTION

In a typical computer environment, a Local Area Network ("LAN") allows for one or more computer servers to be connected to several computers such that the resources of each server are available to each of the connected computers. The LAN is typically comprised of networking equipment such as routers, hubs, switches, etc. In this networked environment, a dedicated keyboard, video monitor and mouse may be employed for each computer and server.

To maintain proper operation of the LAN, the system administrator must maintain and monitor the individual networking equipment, servers, and computers. This maintenance frequently requires the system administrator to perform numerous tasks from a user console connected to the networking equipment, server, or computer. For example, to reboot a computer or to add or delete files, the system administrator is often required to operate the server or computer from its local user console, which may be located at a substantial distance from the system administrator's computer and from other computers or servers connected to the LAN. Therefore, to accomplish the task of system administration, the system administrator must often physically relocate to access the local user consoles of remotely located servers and computers.

As an alternative, dedicated cables may be installed from each remotely located server and computer to the system administrator's user console to allow the system administrator to fully access and operate the remote computer equipment. However, this alternative requires substantial wiring and wire harnessing, both of which may require tremendous cost. Additionally, there is generally an inverse relationship between the distance from the system administrator's user console to the remote computer equipment and the quality of the transmitted signal (i.e., as the distance increases the quality of the transmitted signal decreases). Thus, dedicated cables between the system administrator's user console and remote computer equipment may not be a feasible alternative.

In some situations, it is desirable to manage the networking equipment, servers, and computers remotely located from the system administrator. For example, a software program such as pcAnywhere may be utilized to access a remote computer over the Internet or a LAN utilizing the keyboard, video monitor, and cursor control device (e.g., a mouse) attached to a local user workstation. Remote computer access programs typically require that host software installed on the remote computer and client software installed on the user workstation. To access a remote computer, a user of the user workstation selects the desired remote computer from a list and enters the appropriate user name and password. Once access has been granted to the remote computer, the user utilizes the keyboard, video monitor, and cursor control device attached to the local user workstation to access and operate the remote computer.

Hardware solutions also exist for operating a remote computer from a user workstation over a LAN or through a dedicated network. In contrast to the software solutions, the hardware solutions do not typically require host or client software. Instead, the hardware solutions typically utilize a keyboard, video monitor, and mouse ("KVM") switch accessible over a LAN via a common protocol, such as Transfer Control Protocol/Internet Protocol ("TCP/IP"). Generally, a user or system administrator accesses the remote computers attached to the KVM switch via an Internet browser or client software associated with the KVM switch. Once the remote computer has been selected, the remote computer's video signal is routed to the user workstation's video monitor and a user may then utilize a keyboard and mouse to control the remote computer. The KVM switch may additionally include a connection to the power source of the remote computer for a hard reboot in case of system failure.

The aforementioned hardware and software solutions generally utilize a compression algorithm to reduce the necessary bandwidth required to transmit the video signals. For example, the wireless remote network management system of the present invention may utilize the compression algorithm disclosed in application Ser. No. 10/898,001, which is incorporated in its entirety herein by reference, to reduce and compress the digital data that must be transmitted from remote devices with video. Alternatively, the system of the present invention may utilize standard video compression algorithms such as MPEG-2 or MPEG-4.

A KVM switching-system may be utilized to allow one or more user workstations to select and control any one of a plurality of remote computers, such as servers, via a central switching unit. Such systems are well known in the art and have been used by system administrators for several years. KVM switching systems allow system users to control remote computers using one or more local user workstations' keyboard, video monitor, and cursor control device as if these local devices are directly connected to the remote computer. In this manner, a system user may access and control any of a plurality of remote computers from a single location (i.e., the location of the user workstation). The system user may select a specific remote computer to access and control using any one of a variety of methods known in the art including pushing a button that corresponds with the desired remote computer and is located on the face of a computer management system component, selecting the computer from a list displayed on a computer management system component's LCD or LED display, pressing one or more "hot keys" on the local user workstation's keyboard (e.g., F1, ALT-F1, F2, etc.), selecting the remote computer from a list displayed on the user workstation's monitor by pointing to it or scrolling to it using the user workstation's keyboard or cursor control device.

Recently, KVM devices have begun utilizing Internet Protocol ("IP") in order to allow users at a local computer to communicate with and control remote devices. Keyboard, Video, and Mouse over Internet Protocol ("KVMoIP") technology utilizes conventional network infrastructures to permit remote access and control of computers and other devices.

KVMoIP devices offer several advantages over traditional KVM switches. In traditional KVM switches, one generally has to run cables from each server to switch chassis, then run more dedicated cables from switch-to-switch, and run still more cables from switches to each end-user console. The cabling is not only costly, but also laborious and requires both effort and knowledge in larger systems. Additionally, space becomes a consideration as these systems generally take up a large amount of room. KVMoIP systems offer a simplified solution to this cabling problem. The KVMoIP equipment can be anywhere the computers are, with short cables from the KVMoIP unit to the local computers. Only one CAT5 cable need be run from the KVMoIP unit to an Ethernet hub.

Additionally, KVMoIP systems make it easier to add more computers to the existing network. When computers need to be added, they do not have to be located in the same room or even same building as in traditional analog based KVM equipment. All that is necessary is to plug in the KVMoIP unit into an accessible network. This design eliminates the need for more switch-to-switch wire runs, or other cable extenders.

KVMoIP devices generally connect directly to an IP network via a Network Interface Card ("NIC"). Users accessing the KVMoIP device can select one or more of the switch inputs at any time and a number of independent user sessions are supported. In traditional KVM switches, only one switch computer can be displayed at any time.

Many KVMoIP systems incorporate software, which is often proprietary and features one or more methods of accessing a KVMoIP device. Other systems known in the art access KVMoIP devices via web browsers, Virtual Network Computing ("VNC") clients, etc. Generally, local consoles, dial-up, and serial connections offer a backup.

There has also been a proliferation of wireless technologies to enable computers to communicate and share resources. For example, the Bluetooth and IEEE 802.11 standards are two rapidly developing technologies that allow computers to wirelessly communicate. Devices are commercially available that comply with the 802.11 standard and enable wireless TCP/IP communications over distances of up to three hundred (300) feet. For example, Personal Computer Memory Card International Association ("PCMCIA") wireless cards enable laptops to communicate utilizing the TCP/IP protocol. Further, many newer laptops come standard with wireless communication access devices. 802.11 compatible wireless local area networks ("WLANs") are now often utilized in lieu of, or in conjunction with, LANs. Bluetooth devices are generally utilized for shorter-range communication, utilizing lower transmission rates than 802.11 compliant devices.

The 802.11 standard, ratified by the Institute of Electrical and Electronics Engineers ("IEEE") in 1997, is a wireless communications standard generally utilized for networking, file sharing and Internet connection sharing. In 1999, two extensions to the 802.11 standard were added, 802.11a and 802.11b. The 802.11a standard operates in a frequency range of 5 Gigahertz (GHz) at speeds of up to 54 Megabits per second (Mbps). The 802.11b standard, was designed to be more affordable, and operates in the 2.4 GHz range at speeds of up to 11 Mbps. With the proliferation of 802.11b devices, the 802.11g standard was recently ratified which allows for 802.11a speeds in 802.11b compatible frequencies.

All 802.11 standards allow for computers to communicate wirelessly without the need for hubs, routers, switches, etc. The 802.11 standard allows for the creation of WLANs, which use the same TCP/IP communication protocols as traditional wired LANs. With commercially available wireless communication devices, two computers can communicate from up to three hundred (300) feet away, although with repeaters, stronger antennae, signal boosters, etc., this range may be increased. Today, wireless networks are available in airports, coffee shops, college campuses, etc.

Importantly, the 802.11 standard allows for at least two different network configurations: (1) an infrastructure mode in which all traffic passes through a wireless access point, and (2) an "ad-hoc" mode (or "peer-to-peer" mode) in which computers communicate without any central device. Independent of the mode, the 802.11 standard supports wireless networks that offer the same communications (e.g., TCP/IP, file sharing, Internet sharing, etc.) as a wired connection.

In the infrastructure mode, devices communicate through a wireless access point. An access point is similar to a hub, or router (but without wires), in that it receives and transmits all data between wireless devices. Advantages of the infrastructure mode include increased scalability, increased range of communication, and access to a wired network. Specifically, by adding access points, the network can grow without undo burden on any one device. An access point can also be utilized to increase the range of communications. Cascading access points and signal boosters can overcome the three hundred (300) foot communication limit of most 802.11 devices. Finally, traditional access points also offer access to a wired network. Therefore, an infrastructure network easily adapts to communicate with an Ethernet LAN or an Internet connection.

An ad-hoc network is more dynamic—it can be created and torn-down easily without any additional hardware. Computers can enter and leave the network so long as the computer is configured to access a wireless network with the same service set identifier ("SSID") as the other computers in the network. Generally, an SSID is a sequence of alphanumeric characters that identifies the ad-hoc network. An ad-hoc network also has the advantage that it requires no external hardware and can be created with multiple computers alone, so long as each computer has a WiFi compatible communications device.

An important feature of the 802.11 standard is the availability of multiple channels of communications, utilizing Direct Sequence Spread Spectrum ("DSSS") technology. DSSS allows for the transmission of data over a range of frequencies thus decreasing the power utilized at any one frequency. Therefore, DSSS allows for fast communications with little interference and permits an 802.11 network to include multiple communications channels. Further, the wireless network can co-exist with other wireless devices that operate in similar frequency ranges.

Generally, in an ad-hoc network, one of the available channels (the FCC currently allows for eleven (11) total channels) is utilized as a "broadcast" channel. The broadcast channel allows devices to "discover" other devices in range of communication and to transmit messages that are received by all devices. Thus, the broadcast channel is a critical feature of the 802.11 standard that allows for the creation of ad-hoc networks in which devices can automatically join and leave the network. The network then utilizes one of a variety of algorithms such as a spokesman election algorithm ("SEA") or a broadcast/flooding algorithm for all other communications. In SEA, one computer is "elected" to head the network and tracks the addition of other computers to and from the network. In a broadcast/flooding algorithm, generally all messages are sent to all computers. If an access point is utilized, then no such algorithms are necessary, and instead, the access point may be utilized to ensure that all messages reach the correct destination.

Systems that enable wireless access of a remote computer are currently known in the art of computer management. For example, one such system comprises a single receiver and a single transmitter that, together, allow a user to access a remote computer using a keyboard, video monitor, and mouse. In this system, both the receiver and the transmitter are enabled for wireless communication. The receiver, coupled to the keyboard and mouse, receives keyboard and mouse data and wirelessly transmits this data to the transmitter. The transmitter is coupled to a remote computer and supplies the data to the keyboard and mouse ports of this remote computer. Simultaneously, the transmitter receives video data from the remote computer and transmits this data wirelessly to the receiver where it is displayed on the video monitor coupled to the receiver. Thus, this system enables extended length access of a single remote computer through a wireless connection.

Another known system consists of a switching device for controlling multiple remote computers where the switching device comprises a wireless transmitter and a wireless receiver. The switching device is configured to enable a user to select from among multiple computing devices and wirelessly link a peripheral device with a selected computing device for user interaction. In this system, the switching device initially develops a list of available computing devices. A user chooses from this list and the switching device establishes a wireless link with the corresponding computing device. Thus, this wireless switch only enables one connection between a user and a remote computer at any instance. Further, each of the computing devices must also have wireless communications capabilities to enable wireless communication with the switch.

A method for switching the utilization of a shared set of wireless input/output ("I/O") devices between multiple computers is also known. This method includes the utilization of a software-based switching mechanism where wireless protocols enable the sharing of wireless peripheral devices between multiple computers. A wireless data packet (a "token") is utilized to transfer control of the I/O devices utilizing a master/slave relationship for the transfer of control. The token is the computer-to-computer wireless command utilized to transfer control of a wireless peripheral device from one device to another. Thus, in this known system, server-to-server communications are necessary for transferring the control of a wireless peripheral. Further, in this system only one computer can control a set of wireless peripherals at a time.

In another known system for accessing computer systems in a computer network, each computer system provides and receives operator interface data signals containing user output and input information. Central to this system is a wireless administrator device that allows a system operator to remotely control a plurality of computer systems interconnected through a communications network. The wireless administrator device includes a wireless communications module that operates in "transmit" and "receive" modes to communicate with the wireless communication modules coupled to the computer systems. The wireless administrator device includes an operator interface with a video display, mouse and keyboard to enable user interaction in a selection mode or a control mode. The interface includes a manual connect button that allows the administrator to display on the video a list of available computer systems that may be accessed. Upon selection of a computer, the administrator remotely controls the computer through the operator interface.

Finally, systems are also known that provide a wireless interface between a remote host computer and a personal digital assistant ("PDA"). In one such system, the PDA presents the user with a graphical user interface ("GUI") allowing for input by way of a passive stylus, which can be used in a pen or mouse mode. The PDA also includes a transceiver that communicates wirelessly with the transceiver of a remote computer. The transceivers allow the wireless device to access the remote host computer over a wireless LAN or through a peer-to-peer network. The system also allows a user to view available remote host computers through the GUI of the wireless device and to access the programs and files of the remote computer. The remote computer in turn, transmits display commands to the wireless device. A similar system utilizes Bluetooth communications to enable a PDA to recognize and identify all compliant remote devices by transmitting a broadcast message that is received by compliant remote devices. In this system, the PDA includes a GUI to display a rendering of a mechanism that can be utilized to control a remote device. For example, the rendering might be of an on/off switch. The PDA receives input from a stylus, and translates this input into a command for the remote device.

In view of the foregoing, a need clearly exists for a wireless remote network management system capable of non-intrusive, secure, wireless operation and control of networking equipment, servers, computers, and other remote devices. Furthermore, such as system should enable digital remote KVM access via IP networks such as WLAN, LAN, and the Internet. The system should also allow a user to view all available remote computers via an on-screen user interface and to choose one of these computers to monitor and control. Finally, the system should capture, digitize, compress and transmit video with keyboard and mouse signals to and from a variety of remote devices.

SUMMARY OF THE INVENTION

It is often convenient to control one or more connected computers from one local set of peripheral devices (i.e., keyboard, video monitor, cursor control device, etc.). Since the majority of computers in use today incorporate or are designed to be compatible with commonly known and used computer technologies (e.g., IBM, Apple, Sun, etc.), many computers use identical or similar electrical connectors to connect a peripheral device. Also, a computer typically contains a dedicated electrical connector for each type of peripheral device to which the computer will be connected. Generally, the cables connecting such peripheral devices to a computer are approximately six (6) feet in length, thereby limiting the distance from the computer at which the peripheral devices may be located.

In many circumstances, it is desirable to separate the peripheral devices from the computer due to space constraints. However, one skilled in the art may readily appreciate that separating a computer from its peripheral devices may make it difficult to locate the remote computers because they are commonly located in another area of the building, such as in a data center, server-farm, etc. Unless each device is clearly labeled, there exists no means of differentiating computers without their attached peripheral devices.

In addition to extending the distance between a computer and its peripheral devices, it is also convenient to access and operate more than one computer from one set of peripheral devices. Again, this feature is desirable when space is limited.

It may also be desirable to access a computer through wireless communications. In many situations it is difficult to run wires from the location of a server to its set of peripherals. Further, the utilization of longer wires necessarily leads to the degradation of the signals transmitted. For example, the high frequency components of such transmitted signals are often severely attenuated.

The present invention provides a wireless remote computer management system for administrating remote computers and devices from one or more local workstations, which may be any workstation with Internet connectivity. Examples of workstations, include, but are not limited to, desktop computers, laptops, PDAs, and tablet PCs. The present invention may include a network switch or hub for connectivity to the LAN. An access point is preferably utilized to increase the scalability of the invention. The access point may be further connected to a hub, switch, router, etc. as necessary. The present invention also enables users to access and control remote devices via the Internet.

In the system of the present invention, a user workstation preferably comprises a wireless-enabled user station ("WUST") coupled to peripheral devices such as a keyboard, monitor, and cursor control device (e.g., a mouse). The WUST utilizes wireless communications to communicate with a wireless-enabled computer interface module ("WCIM"), which is interfaced with a remote computer via one or more access points. Further, the WCIM includes wireless capabilities and connects to the keyboard, monitor and cursor control device ports of a remote computer. It is foreseeable that other connections may be included as necessary to interface with different remote devices. The WCIM is compatible with both ad-hoc and infrastructure networks and operates within a broadcast or non-broadcast mode. The present invention allows a user to view a list of available remote computers and other devices and to select a remote device from this list for control. In ad-hoc mode, the list may be automatically updated as remote devices enter or exit the wireless network.

In the present invention, each remote device (e.g., networking equipment, server, computer, etc.) is preferably connected to a WCIM. The WCIM may also have serial ports for connection to the networking equipment as well as keyboard, video, and cursor control device ports for connection to the servers and computers. Additionally, the WCIM may contain Universal Serial Bus ("USB") ports, parallel ports, etc., and a port for connection to a power supply capable of controlling the power to the networking equipment, server, or computer. Standard cabling is utilized to connect the networking equipment, server, or computer to the appropriate ports on the WCIM. The WCIM is preferably powered via the remote device it is connected to, thus requiring no additional power sources or cabling. Alternatively, the WCIM may be powered by a power pack included within the WCIM or via a power supply connected to the WCIM. It is foreseeable that the WCIM may be internal to the remote device (e.g., internal to a server) thus alleviating any power issues that arise with an external WCIM design.

Central to the present invention is the wireless communications that enable the WUSTs to communicate with the WCIMs. Preferably, the WUST and WCIM utilize 802.11 protocol, such as 802.11b/g/a, and 802.11 compliant hardware to communicate via one or more access points, switches, routers, etc. through a wireless network. This communication is utilized by the WUST to request a connection to the WCIM, and upon completion of the connection, to receive compressed video data from the WCIM. In turn, the WUST sends data including keyboard and cursor control device data packets, serial data, USB control data, etc. to the WCIM via the network. The WCIM utilizes this data to emulate mouse, keyboard, USB, etc., signals to the associated remote device. In ad-hoc mode, the WUST and WCIM may communicate directly. Utilizing this communication, the WUSTs are automatically "aware" of all available remote computers coupled to WCIMs.

The user workstation requests connection to a remote device connected to a WCIM via the access point. After the request is granted, the WCIM receives video signals from the remote computer, digitizes and compresses the video signals, and transmits compressed video information to the user workstation via an access point. The information may be transmitted over a network, the Internet, etc. In turn, the user workstation (e.g., a desktop computer, laptop, PDA, tablet PC, etc.) transmits keyboard and cursor control device data to the WCIM via a network through an access point. The WCIM uses this data to provide emulated keyboard and cursor control device data to the keyboard and cursor control device ports of the remote computer. The user workstation decompresses the video information and provides video signals to the local monitor. In this manner, a user of the workstation can control the remote computer by utilizing the local keyboard and cursor control device, while viewing video signals from the remote computer on the local monitor.

In ad-hoc mode, the WUST and WCIM utilize the broadcast channel to set up a connection. The WUST requests a connection by sending a message over the broadcast channel, and the WCIM either accepts or denies the request. After a connection is established, the WUST and WCIM communicate on a non-broadcast channel. Preferably, this channel is selected by the WUST and identified as part of a request message.

An important feature of the present invention is the ability to display a list of available remote devices to a user on the user's local monitor. A variety of methods may be utilized to generate and display the option menu. Preferably, the WUST includes a central processing unit ("CPU") that generates an option menu. Alternatively, an on-screen display ("OSD") processor may be utilized. In one embodiment the WUST can be implemented as a purely software solution, and can be run on any computer, laptop, PDA, etc. that has wireless (802.11) communication capabilities. In this embodiment, the option menu may be implemented as part of the WUST software, and may take advantage of existing APIs to display the option menu in a user-friendly fashion.

In infrastructure mode, the WUST and WCIM communicate through an access point, or a wireless KVM switch. Importantly, the wireless KVM switch may be a hybrid switch thus supporting both wired and wireless connections. In this configuration, a WUST can communicate with a WCIM, even if the WCIM does not have wireless capabilities. That is, the WCIM can connect to the hybrid switch utilizing traditional cabling, and, in turn, the switch can communicate over an 802.11 connection with the WUST. Also, this configuration enables users at workstations to be hardwired to the hybrid switch and thus access and control remote devices connected to a WCIM. Because both the wired and wireless communication devices utilize TCP/IP communications, the hybrid switch does not need to interpret or translate the data. Another advantage of the utilization of an access point is the ability of the access point to connect to the Internet. Thus, a user workstation with Internet connectivity can connect to the access point remotely and in turn, control a remote device. In this embodiment there is no restriction on the location of the user workstation. Further, the user workstation is not required to have wireless capabilities.

Therefore, it is an object of the present invention to provide an improved wireless device management system that enables a user to control remote computers and other remote devices from local user workstations.

It is also an object of the present invention to provide digital remote KVM access via IP networks such as a LAN, WLAN, or the Internet.

It is another object of the present invention to provide non-intrusive remote access and control of remote devices.

It is still another object of the present invention to require no additional software to run on the remote device in order to eliminate any potential interference with the remote device's operation or network performance.

Further, it is an object of the present invention to provide a wireless device management system that allows one or more local user workstations to access and control remote devices utilizing an infrastructure or ad-hoc wireless network mode.

It is yet another object of the present invention to provide a secure, wireless device management system that allows a local user workstation to wirelessly control a remote device utilizing a local keyboard and cursor control device, and to wirelessly receive video signals from the remote device.

Additionally, it is an object of the present invention to provide a wireless KVM network that enables a user workstation to provide a list of available remote computers and devices.

Further, it is an object of the present invention to provide a secure modular, wireless, device management system that allows one or more sets of peripheral devices to access and operate one or more remote computers as if the local peripheral devices were directly connected to the remote devices.

A different object of the present invention is to operate under broadcast and non-broadcast modes.

Furthermore, it is an object of the present invention to allow information technology ("IT") personnel to easily manage a volume of servers for both small-scale and large-scale computer centers such as data-centers, server-farms, web-hosting facilities, and call-centers.

In addition, it is an object of the present invention to provide a wireless modular computer management system that eliminates the need for a set of peripheral devices for each remote computer thereby minimizing the space required to house the remote computers.

It is yet another object of the present invention to be platform independent thus simultaneously supporting a variety of platforms.

It is still yet another object of the present invention to automatically sense video resolution to optimize screen capture.

Further, it is an object of the present invention to provide high performance mouse tracking and synchronization.

Finally, it is an object of the present invention enable a DHCP or static configuration.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
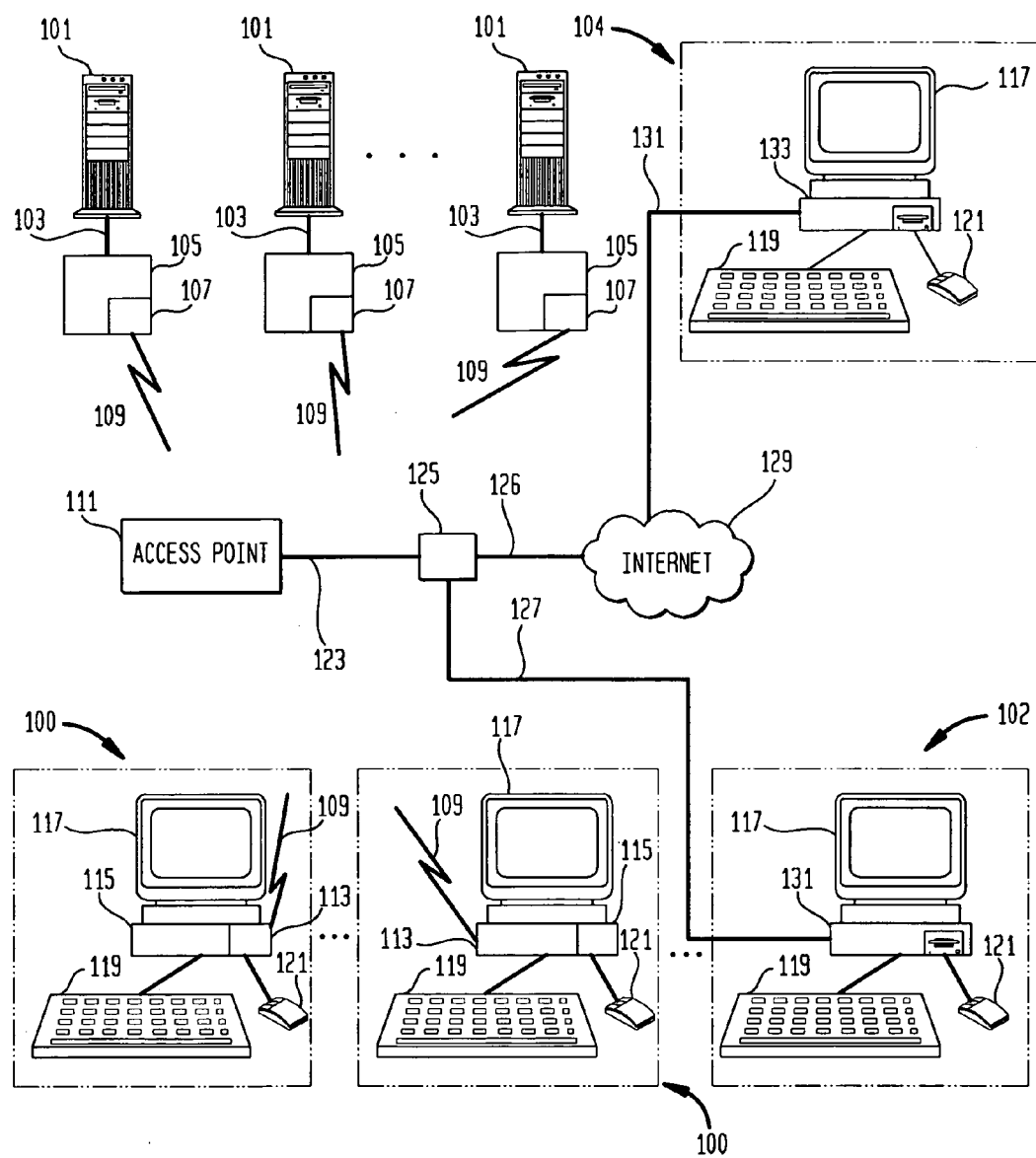
FIG. 1 is a schematic representation of the wireless remote device management system according to the preferred embodiment of the present invention illustrating the connection of user workstations to a remote computer, where each user workstation is coupled to a keyboard, monitor and cursor control device and each remote computer is directly connected to a wireless-enabled computer interface module ("WCIM").

Referring first to FIG. 1, depicted is the architecture of the preferred wireless remote device management system in accordance with the present invention. The system shown includes multiple wireless user workstations 100 each having a wireless-enabled user station (WUST 115) coupled to a keyboard 119, video monitor 117, and cursor control device 121. Each WUST 115 includes a wireless communications device 113 that is preferably an 802.11 compliant device, although other known standards may be utilized. The system also includes a plurality of remote devices 101. For simplicity, only two (2) user workstations 100 and three (3) remote devices 101 are shown. However, one of skill in the art will readily appreciate that the present invention may include many more user workstations 100 and remote devices 101. Further, the remote devices may be of several types, including but not limited to, computers, servers, network printers, and other networking devices.

Each remote device 101 is directly connected to an associated wireless computer interface module (WCIM 105). Each WCIM 105 has a wireless communications device 107 to communicate with access point 111 and one of a plurality of WUSTs 115. Although only one access point 111 is shown, a plurality of access points may be implemented within the system. Preferably, in such a configuration, the access points are cascaded to increase the distance of communication.

During operation, WUST 115, using wireless communications device 113, communicates wirelessly with any one of the plurality of WCIMs 105 over a network through access point 111. Specifically, WUST 115 transmits keyboard and cursor control device signals, preferably as TCP/IP data packets, over wireless communications path 109 to a select WCIM 105 via access point 111. Simultaneously, WCIM 105 transmits compressed video data signals along with keyboard and cursor control device signals as necessary, also preferably as TCP/IP data packets, over wireless communications path 109 to WUST 115. Thus, the system of the present invention enables a user at user workstation 100 to view and control any one of a plurality of remote devices 101 via wireless communications path 109.

Although 802.11 compliant wireless communications is the preferred wireless standard for use with the present invention, other types of wireless connections such as 802.15.3, infrared, or Bluetooth compliant communications may be utilized, depending on the specific needs of the system user. The 802.11 standard enables communications over extended distances where the speed of the signal can automatically be reduced as the distance increases thus avoiding excessive degradation of the signal. Additionally, standard radio communications utilized in 802.11 standards do not require line-of-site communications. Finally, the 802.11 standard enables the system of the present invention to utilize TCP/IP communications, therefore enabling the establishment of a WLAN network without extensive software development.

Regardless of the type of wireless network utilized, one of primary purposes of the present invention is to allow a user at a user workstation 100 (as well as at user workstations 102 and 104 as discussed below) to select and subsequently control a remote device 101. This selection may be accomplished through a variety of methods. In one embodiment, a menu or list of available remote devices 101 is displayed on the screen of video monitor 117. WUST 115 can utilize information provided by the wireless network to update the option menu displayed to the user with a list of available remote devices. The WCIM 105 automatically senses the video resolution of remote device 101 to enable the best possible screen capture. Additionally, the option menu may give the user the ability to manually adjust video settings to improve the quality of the transmitted video. In ad-hoc mode, the WCIMs 105 and WUSTs 115 can automatically "discover" other devices within range of communications.

Also connected to access point 111 is switch 125 via connection 123. Connection 123 is generally a hardwired connection such as a standard CAT5 cable. Although shown separately for the purposes of the drawing, access point 111 and switch 125 may be easily integrated into a wireless access point router. Switch 125 also supports Internet connectivity. For example, switch 125 may include a NIC to connect to Internet 129 through Internet connection 126, which may be a cable modem, DSL line, T1 line, etc. Advantageously, this connection allows remote access from any user workstation equipped with Internet connectivity. For example, user workstation 104 (comprising video monitor 117, computer 133, keyboard 119, and cursor control device 121) is connected to Internet 129 through Internet connection 131. User workstation 104 can thus access and communicate with switch 125 utilizing TCP/IP protocol. Hence, user workstation 104 can communicate with any remote device 101, regardless of the location or wireless capabilities of user workstation 104.

Switch 125 is also connected to user workstation 102 via hardwired connection 127, which is preferably CAT5 cabling. User workstation 102 (comprising video monitor 117, keyboard 119, cursor control device 121, and computer 131) can manage and control any of the plurality of remote devices 101. Further, user workstation 102 bi-directionally communicates with and controls any one of the plurality of remote devices 101. Although only one (1) user workstation 102 and 104 is shown, one of skill in the art will readily appreciate that the present invention enables remote access via a multitude of user workstations 102 and 104. User workstations 102 and 104 preferably utilize an on-screen menu as previously discussed to control remote devices 101.

Figure 2:
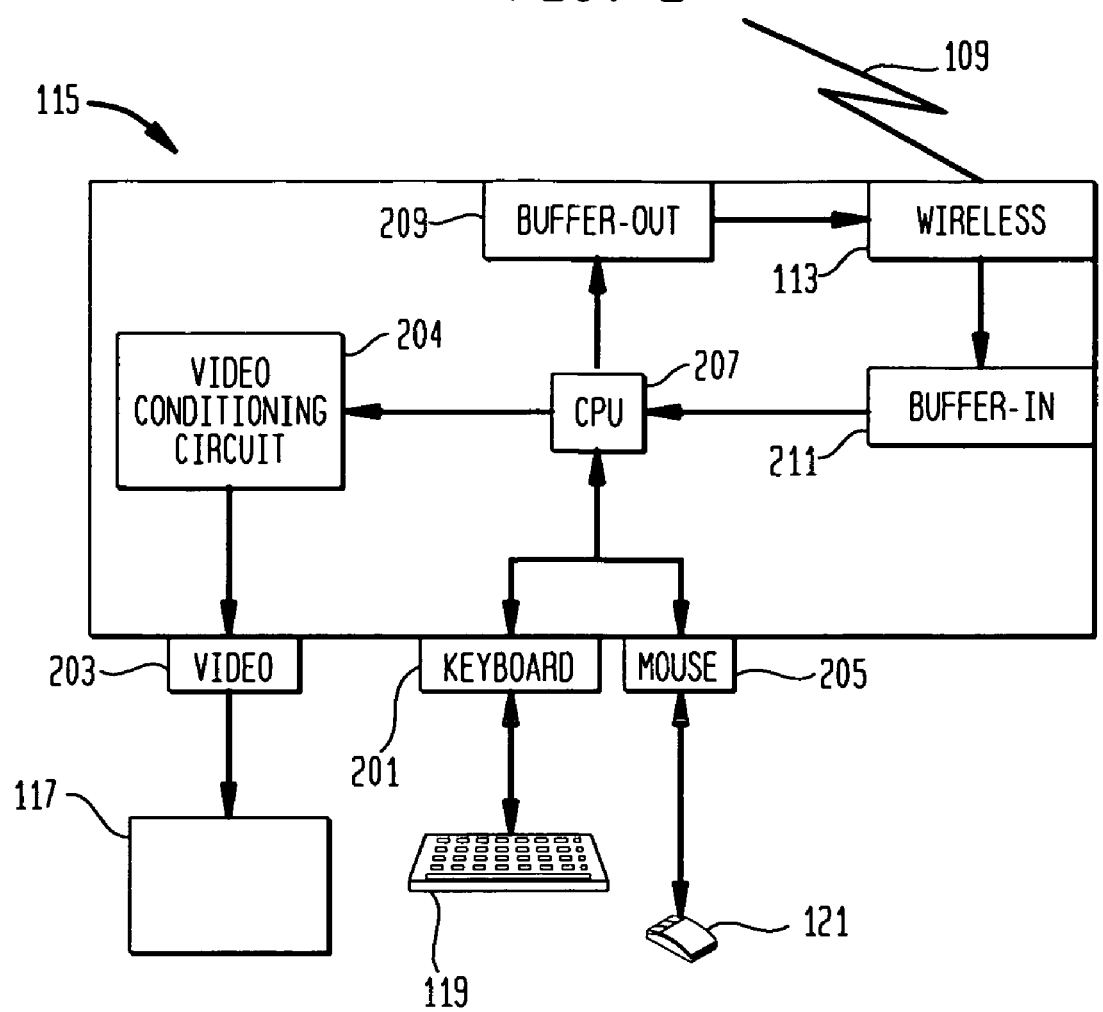
FIG. 2 is a schematic representation of a wireless-enabled user station ("WUST") as shown in FIG. 1 according to the preferred embodiment of the present invention illustrating a block diagram of the internal structure of the WUST and connectors for a keyboard, video monitor, and cursor control device.

Referring next to FIG. 2, depicted is a block diagram of the preferred embodiment of WUST 115. WUST 115 interfaces with video monitor 117, keyboard 119, and cursor control device 121 (although other peripheral devices may also be used such as USB peripherals, serial devices, etc.) in order to control any of a plurality of remote devices 101. Keyboard 119, video monitor 117, and cursor control device 121 are preferably connected to keyboard port 201, video port 203 and cursor control device port 205 of WUST 115, respectively, using industry standard connectors and cabling. For example, the keyboard and cursor control device may be connected utilizing PS/2 connectors, serial connectors, USB connectors, etc. Monitors are typically connected to a computer through a DB-15 port, but may be connected utilizing other connectors as necessary.

During operation, WUST CPU 207 receives the keyboard and cursor control device signals generated by keyboard 119 and cursor control device 121, respectively, at the local user workstation 100 via keyboard port 201 and cursor control device port 205, respectively. WUST CPU 207 interprets these signals and generates data packets that include data representative of the keyboard and cursor control device information from the received keyboard and cursor control device signals. The data packets are combined with other information (such as destination information) and are included in TCP/IP communications sent by wireless device 113 over wireless communications path 109 to access point 111 and subsequently to WCIM 105 also via wireless communications path 109. Wireless device 113 may receive the packets from CPU 207 through a buffer (i.e., buffer-out 209). Alternatively, CPU 207 may directly connect to wireless device 113.

Keyboard and cursor control device signals may be transmitted bi-directionally in the wireless remote device management system of the present invention. That is, these signals can also be transmitted from remote device 101 to user workstation 100. In this direction of transmission, keyboard and cursor control device signals are received as part of the data transmitted to wireless device 113 over wireless communications path 109, and can be temporarily stored in buffer-in 211. WUST CPU 207 uses this information to emulate or interpret the keyboard and cursor control device signals from remote device 101. These signals can be utilized to, inter alia, determine if the remote device is responsive to the user's cursor control device and keyboard.

Unidirectional digital compressed video signals are received by wireless device 113 as part of TCP/IP data. As discussed below (FIG. 3), WCIM 105 includes hardware and software to digitize and compress video received from remote device 101. This compressed data is received by wireless device 113, and may be temporarily stored in buffer-in 211. WUST CPU 207 receives the compressed video data and transmits this data to video conditioning circuit 204 where it is decompressed and converted to an analog format compatible with video monitor 117. The system of the present invention may utilize the decompression method described in application Ser. No. 10/898,001. The analog video data is sent to video monitor 117 through video port 203.

The user selects a device for control by choosing from the devices on the menu. Preferably, WUST CPU 207 is a general-purpose processor that can be programmed to output an option menu to monitor 117. A general-purpose processor can utilize existing application program interfaces ("APIs") to present a user-friendly (e.g., with extensive graphics) interface to the user. Alternatively, the option menu can be generated by circuitry within WUST 115. For example, WUST 115 may include an OSD processor. The OSD can be instructed by a microprocessor to display a list of available remote devices 101. However, because most commercially available OSDs are character based, providing only a rudimentary interface to the user, a general-purpose processor is preferred.

One of skill in the art will recognize that similar communication occurs between remote devices 101 and user workstations 102 and 104. For the sake of brevity, discussion of this communication is omitted.

A feature of the present invention is the ability to include a list of remote devices that are available for control. Preferably, the list is generated utilizing identification information transmitted with a message by WCIM 105 to access point 111. For example, the identification information may include the name of the remote device, the type of device, or other identification information (e.g., the IP address of the device). This identification information can also be used to logically arrange the available remote devices 101 in groups or trees to present an efficient interface for the user to search for and select a remote device. The option menu may also display information about devices currently controlled by other user workstations.

To switch to another connected device, the user preferably depresses a "hotkey" on keyboard 119 such as "printscreen" or "F1" on keyboard 119 at any one of user workstations 100, 102, or 104. This causes the user workstation to display the option menu on video monitor 117 thus allowing a user to select a new remote device 101. The option menu may refresh every time a user wishes to be interfaced with a different remote device 101 or any time the list is updated.

Although depicted as a hardware device, WUST 115 may be a standard personal computer, laptop, PDA, tablet PC, etc. that utilizes a standard operating system such as Microsoft Windows, UNIX, LINUX, etc. In this embodiment, WUST 115 is a computer equipped with wireless capabilities. Video monitor 117, keyboard 119, and cursor control device 121 communicate with WUST 115 utilizing standard connections well known in the art. Instead of utilizing WUST CPU 207, the functionality of WUST 115 is implemented as a software program. Specifically, the software program utilizes WLAN capabilities to determine what remote devices 101 are available. The software receives messages from its wireless connection and generates an option menu for the user.

An advantage of a software based implementation is that standard software APIs can be utilized to generate the option menu. Further, the menu may have a look and feel that is more familiar to the user (e.g., if Microsoft development software or Java APIs are utilized, the menu will resemble other Windows or Java applications). Utilizing commonly available APIs, the option menu can have graphics, icons, pull-down menus, etc. to present a user-friendlier interface.

As with the hardware solution, the software recognizes the user's selection of remote device 101, and transmits a request to the appropriate WCIM 105. The WCIM 105 can accept or deny the request. If the request is accepted, the WCIM 105 and WUST 115 communicate over a network.

Figure 3:
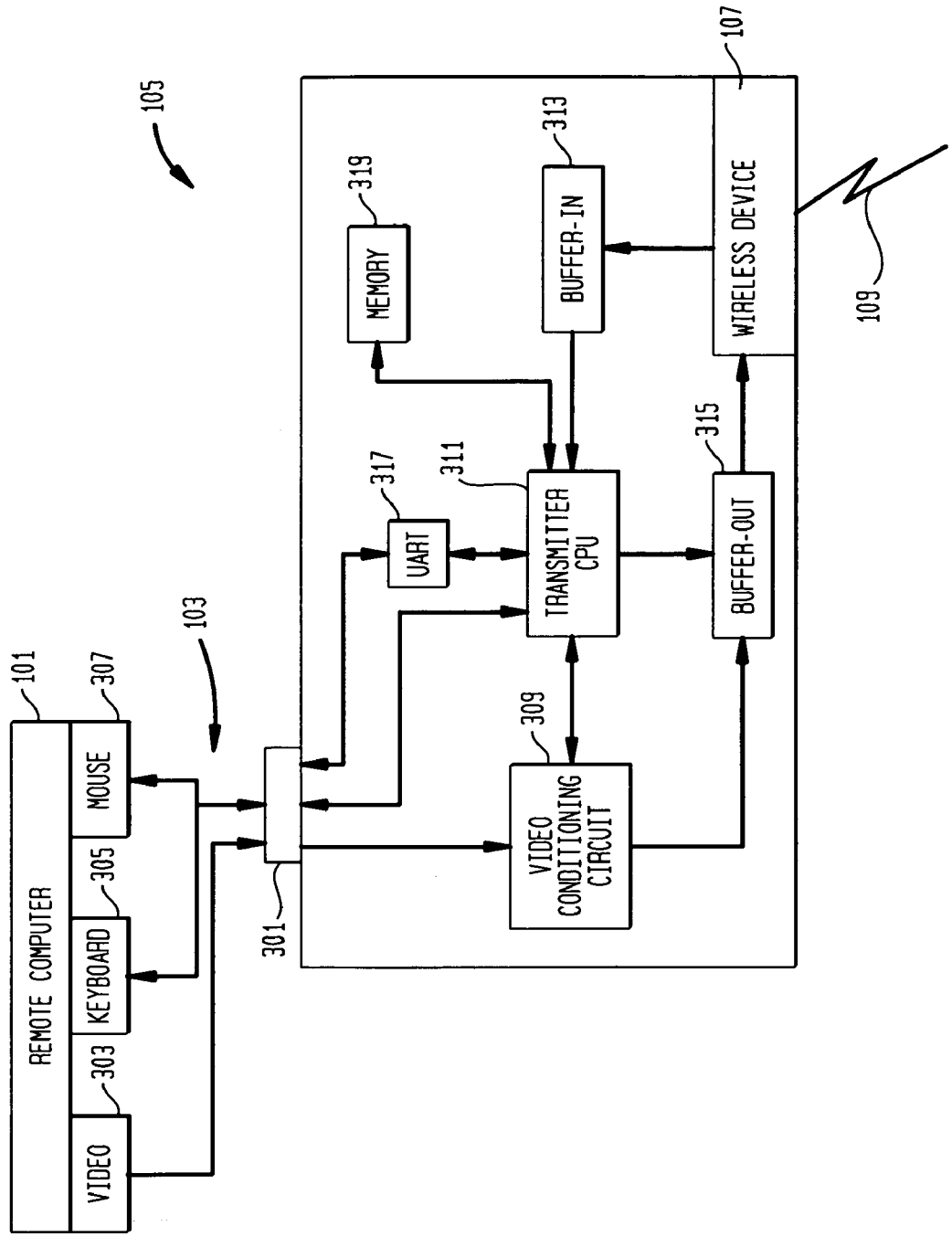
FIG. 3 is a schematic representation of the WCIM shown in FIG. 1 according to the preferred embodiment of the present invention illustrating a block diagram of the internal structure of the WCIM and connectors for a keyboard port, a video monitor port, and a cursor control device port.

Referring next to FIG. 3, depicted is the preferred embodiment of WCIM 105 according to the present invention. WCIM 105 includes KVM port 301 to communicate with video port 303, keyboard port 305, and cursor control device port 307 of remote device 101. During normal operation, WCIM 105 receives unidirectional video signals from remote device 101 through cable 103. If remote device 101 is not a device with video (e.g., a network printer), one of skill in the art will recognize that no video is transmitted. WCIM 105 also transmits keyboard and cursor control device signals to keyboard port 305 and cursor control port 307 through cable 103. Alternatively, each of video port 303, keyboard port 305 and cursor control device port 307 can be connected to WCIM 105 utilizing separate cables for each port. Additional connections, e.g., serial, USB, parallel port, etc. may also be utilized.

Keyboard and cursor control device signals are wirelessly transmitted bi-directionally between remote device 101 and WUST 115. Video signals are preferably unidirectionally transmitted from remote device 101 to WUST 115 (assuming remote device 101 includes video). In certain circumstances, however, video signals may be bi-directionally transmitted. To accomplish the transmission of video, keyboard, and cursor control device data, WCIM 105 preferably includes video conditioning circuit 309, WCIM CPU 311, buffer-in 313, buffer-out 315, UART 317, memory 319, and wireless device 107. Wireless device 107 enables WCIM 105 to communicate over wireless communications path 109 with a WUST 115 via access point 111.

During operation, video signals are transmitted from video port 303 of remote device 101 to KVM port 301 of WCIM 105 via cable 103. From KVM port 301, the unidirectional video signals are transmitted to video conditioning circuitry 309, which converts the analog video to compressed digital video data as wireless communications path 109 has a limited bandwidth (e.g., 54 megabits/second) and is therefore limited to the transmission of digital data. Thus, video conditioning circuit 309 is necessary to enable transmission of video data in accordance with the system of the present invention. Video conditioning circuit 309 preferably utilizes the compression method and hardware described in the aforementioned co-pending application Ser. No. 10/898,001. This method utilizes a compression algorithm that takes advantage of the spatial and temporal redundancies typical of the video output of a remote computer. The method also utilizes algorithms that encode the red, green and blue components of the video signal for transmission over a digital connection. The digitized and compressed video, which may be temporarily stored in buffer-out 315, are transmitted by wireless device 107 to WUST 115 over wireless communications path 109 via access point 111.

Keyboard and cursor control device signals received from keyboard port 305 and cursor control device port 307, respectively, are transmitted via cable 103 to KVM port 301, whereupon the signals are sent to WCIM CPU 311. WCIM CPU 311 creates data packets based upon information received from keyboard port 305 and cursor control device port 307. These data packets, which may be temporarily stored in buffer-out 315, are transmitted to WUST 115 by wireless device 107 utilizing TCP/IP data sent over wireless communications path 109 via access point 111.

Conversely, wireless device 107 receives data packets from WUST 115 through wireless communications path 109 that contain data related to a user's utilization of keyboard 119 and cursor control device 121. These data packets may be temporarily stored in buffer-in 313, and are ultimately sent to WCIM CPU 311. WCIM CPU 311 interprets the data packets received from WUST 115 and generates emulated keyboard and cursor control device signals. These emulated signals are sent to KVM port 301 through UART 317. Specifically, UART 317 converts data from WCIM CPU 311 into a serial protocol understood by keyboard port 305 and cursor control device 307. One of skill in the art will recognize that a similar method may be used for bi-directional communication between user workstations 102 and 104 and remote devices 101.

WCIM 105 also contains memory unit 319, which stores identification information for WCIM 105 and its connected remote device 101 including the assigned name, group, address, etc. This identification information, especially important in ad-hoc mode, is sent by wireless device 107 to WUST 115 for purposes of providing the user a list of available remote devices 101. Further, the identification information can be utilized in the routing of wireless data to the correct WCIM 105.

In the preferred embodiment, remote device 101 provides power to WCIM 105. Thus, the equipment and cabling required for a dedicated WCIM power source is eliminated saving space and money. Alternatively, WCIM 105 may include a separate connector for connecting to a power supply or a battery pack.

Preferably, WCIM 105 is compatible with all commonly used computer operating systems and protocols, including but not limited to those manufactured by Microsoft (Windows), Apple (Macintosh), Sun (Solaris), DEC, Compaq (Alpha), IBM (RS/6000), HP (HP9000) and SGI (IRIX). Additionally, local devices may communicate with remote computers via a variety of protocols including Universal Serial Bus ("USB"), American Standard Code for Information Interchange ("ASCII") and Recommend Standard-232 ("RS-232").

WUST 115 and WCIM 105 also are compatible with, and preferably implement, encrypted or secure wireless transmission. Various standards for secure wireless transmission of data are known in the art. For example, the system of the present invention may utilize the wired equivalent privacy ("WEP") protocol, which adds security to WLANs based on the 802.11 Wi-Fi standard. WEP is an OSI data link layer security technology that can be turned "on" or "off." WEP is designed to give wireless networks the equivalent level of privacy protection as comparable wired networks. WEP is based on the RC4 security scheme that utilizes a combination of secret user keys and system-generated values. The original implementations of WEP supported 40-bit encryption; however, newer versions have 128-bit (or better) encryption. Of course, other methods of ensuring secure wireless transmission of data can be utilized such as the WiFi Protected Access (WPA) protocol, the Extensible Authentication Protocol (EAP), the Advanced Encryption Standard (AES), etc.

Figure 4:
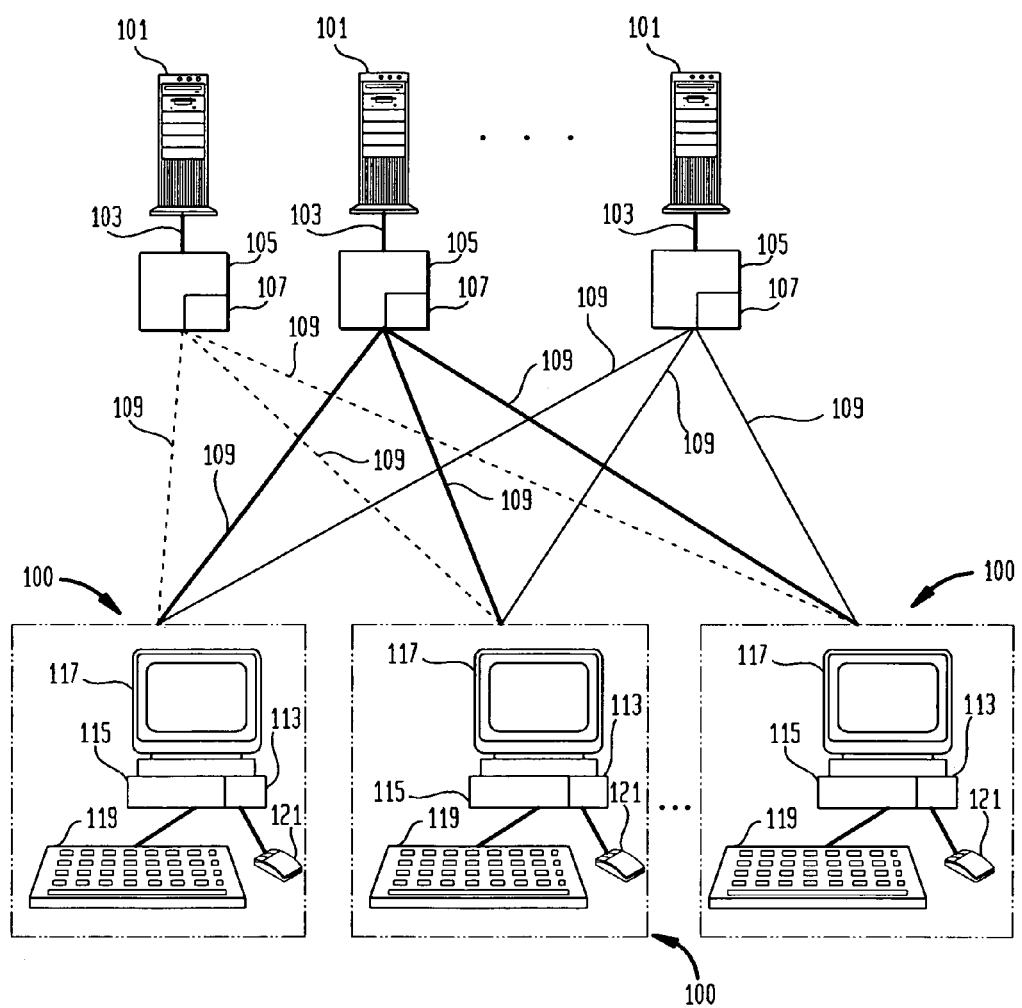
FIG. 4 is a schematic representation of the remote device management system in ad-hoc mode illustrating the wireless connection of a user workstation to a remote device, where each user workstation comprises a WUST coupled to a keyboard, monitor and cursor control device and each remote device is directly connected to a WCIM.

Next, FIG. 4 depicts the architecture of the wireless remote device management system in ad-hoc mode according to the present invention. The system includes workstations 100 each having a WUST 115 coupled to a keyboard 119, video monitor 117, and cursor control device 121. Each WUST 115 includes a wireless communications device 113 that is preferably an 802.11 compliant device, although other known standards may be utilized. User workstations 100 communicate directly with a plurality of remote devices 101, each directly connected to an associated wireless computer interface module (WCIM 105). Each WCIM 105 has a wireless communications device 107 to communicate with one of a plurality of WUSTs 115. Although shown as a desktop user workstation, one of skill in the art will recognize that user workstation 100 may also be a portable device such as a laptop, PDA, or tablet PC. Advantageously, utilizing a portable device enables a user to move around within range of the remote devices and still maintain access and control. A crash cart or mesh topology technique may easily be implemented in such a setup.

During operation, WUST 115, using the wireless communications device 113, communicates wirelessly with any one of the plurality of WCIMs 105. Specifically, WUST 115 transmits keyboard and cursor control device signals, preferably as TCP/IP data packets, over wireless communications path 109 to a select WCIM 105. Simultaneously, WCIM 105 transmits compressed video data signals, also preferably as TCP/IP data packets, over wireless communications path 109 to WUST 115. Thus, the system of the present invention enables a user at user workstation 100 to view and control any one of a plurality of remote devices 101 via wireless communications path 109.

Although 802.11 compliant wireless communications is the preferred wireless standard for use with the present invention, other types of wireless connections such as infrared communications or Bluetooth compliant communications may be utilized, depending on the specific needs of the system user. 802.11 compliant communications is preferred because it allows for the creation of a peer-to-peer wireless local area network ("WLAN"), where devices (e.g., WUSTs 115) automatically discover other devices (e.g., WCIMs 105) in the network.

In ad-hoc, any one of a number of user workstations 100 can connect with any one of a number of remote devices 101. By configuring all WCIMs 105 and WUSTs 115 with the same service set identifier (SSID), WCIMs 105 and WUSTs 115 can automatically "discover" other devices within range of communications. For many commercially available 802.11 compliant devices, the maximum range of communications is; three hundred (300) feet.

The selection and control of remote devices 101 by user workstations 100 is accomplished through a variety of methods. A menu or list of available remote computers 117 is displayed on the screen of video monitor 105. WUST 115 can utilize information provided by the wireless network to update the option menu displayed to the user with a list of available remote computers. The option menu may also give the user the ability to manually adjust video settings to improve the quality of the transmitted video.

Figure 5:
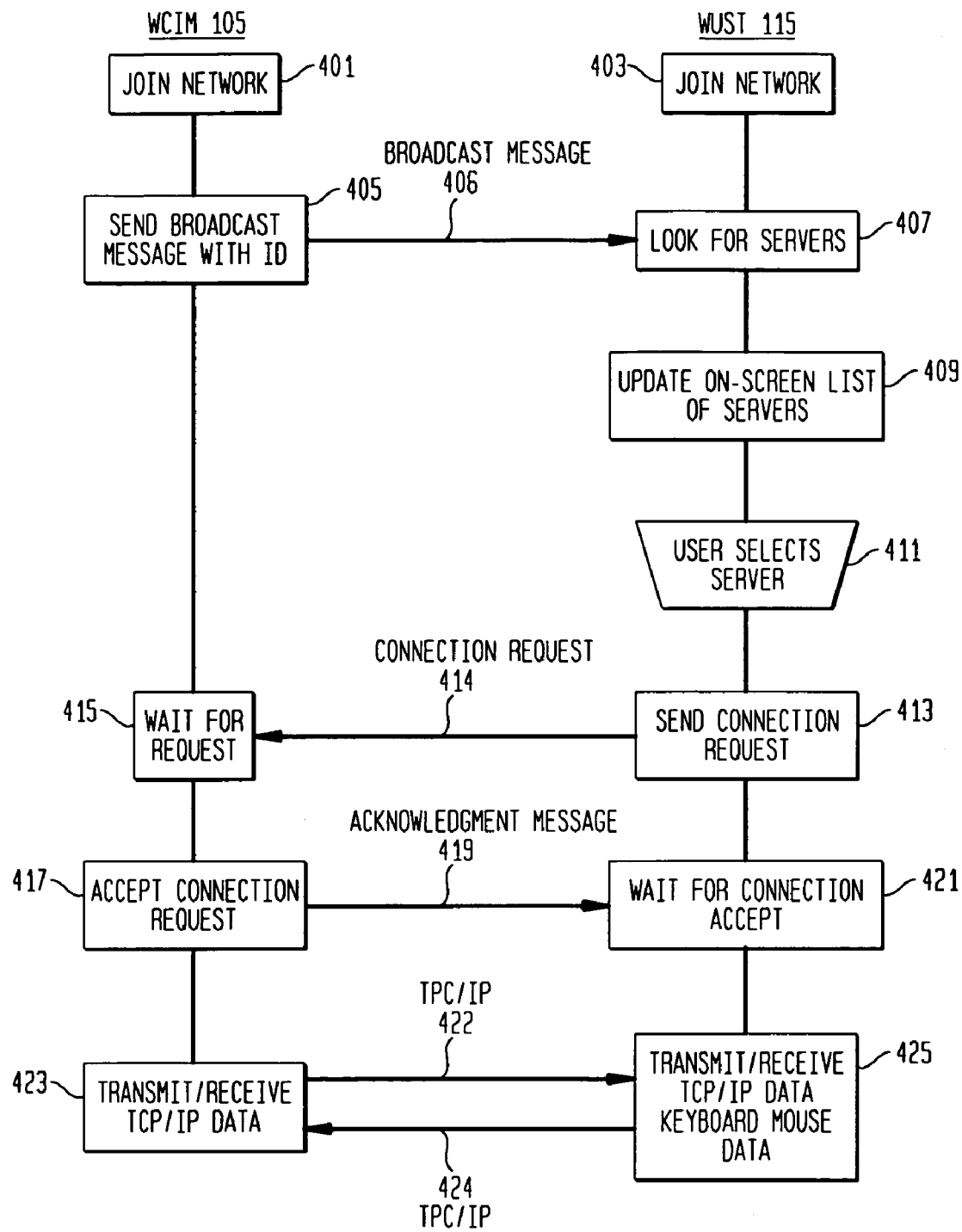
FIG. 5 is a flow chart that details the exchange of information between a WCIM and WUST to setup a connection between a user workstation and a remote device in ad-hoc mode.

Referring next to FIG. 5, depicted is a flow chart that details the exchange of information between a WCIM 105 and WUST 115 in ad-hoc mode necessary to establish a connection between a user workstation 100 (including WUST 115, keyboard 119, monitor 121, and cursor control device 121) and a remote device 101. The flow chart begins with WCIM 105 (coupled to remote device 101) and WUST 115 (with associated keyboard 119, monitor 117 and cursor control device 121) also entering the same network (steps 401 and 403). Entering the network may simply entail coming within a range of communications, being powered-on, etc. As described above, the 802.11 standard supports ad-hoc dynamic networks where wireless devices can automatically enter a wireless network.

In step 405, WCIM 105 sends a broadcast message 406 that preferably includes identification information related to its associated remote device 101. WCIM 105 may be configured to periodically send these broadcast messages to alert WUSTs 115 entering the network of the availability of the associated remote device. Immediately after entering the network, WUST 115 enters a state in which it listens for these broadcast messages (step 407). Upon receipt of a broadcast message, WUST 115 updates the list of available devices displayed to the user on video monitor 117 (step 409).

In an alternative embodiment, WUSTs 115 send broadcast messages that request responses from WCIMs 105. Upon receipt of the broadcast messages WCIM 105 responds with identification information about its associated remote device 101. WUST 115 updates the list of available servers utilizing the identification information.

WUST 115 displays a list of available remote devices 101 to the user, which is updated upon detection of any WCIM 105 entering or leaving the network (step 409). If the user selects a remote device 101 from this list (step 411), WUST 115 sends a connection request 414 over the broadcast channel (step 413). WCIM 105, which is in a waiting state (step 415), can deny the request or accept the request (step 417). For example, if the associated remote device 101 of WCIM 105 is under control of a different WUST 115, WCIM 105 denies the request. If WCIM 105 denies the request, a denial message is sent to WUST 115.

If WCIM 105 accepts the request, WCIM 105 sends an acknowledgment message to WUST 115 (acknowledgment message 419). Once WUST 115 sends connection request 414, it enters a waiting state (step 421) where it remains until it receives acknowledgment message 419. Preferably, connection request 414 includes a channel ID, selected by WUST 115, through which WUST 115 and WCIM 105 communicate upon acceptance and acknowledgement of request 414. As described earlier, an advantage of the 802.11 standard is that it allows for multiple channels of communication within the same network.

Upon acceptance of the connection, WCIM 105 sends acknowledgment message 419 on the requested channel. WUST 115 then begins to transmit TCP/IP data 424, which includes keyboard and cursor control device data from keyboard 119, and cursor control device 121 (step 423). WUST 115 sends this data over wireless communications path 109 to WCIM 105 through the selected channel. WCIM 105 receives the data and utilizes this data to generate signals for the keyboard port 305 and cursor control device port 307 of the remote device 101.

WCIM 105 begins to receive video data from its associated remote device 101. WCIM 105 receives the video data, digitizes the data, and communicates the data, preferably as TCP/IP data 422, through wireless communications path 109 (step 421). This communication continues until the user of WUST 115 selects a different remote device 101 to control.

To choose a different remote device 101, a user at WUST 115 enters a command on keyboard 119 or via cursor control device 121. This command instructs WUST 115 to display an option menu of available remote devices 101 on monitor 117. The option menu includes a list of available remote devices 101, as determined by the receipt of the broadcast messages from associated WCIMs 105 (step 409). As previously discussed, the option menu may also be a GUI, which can include groups and descriptions of available servers, icons representing each server, etc. If the option menu is developed with software, it can have the look and feel of a standard environment (e.g., Windows, Macintosh, Java, etc). A user can select a remote device 101 from the option menu, which initiates transmission of a connection request (step 413) over the broadcast channel.

Figure 6:
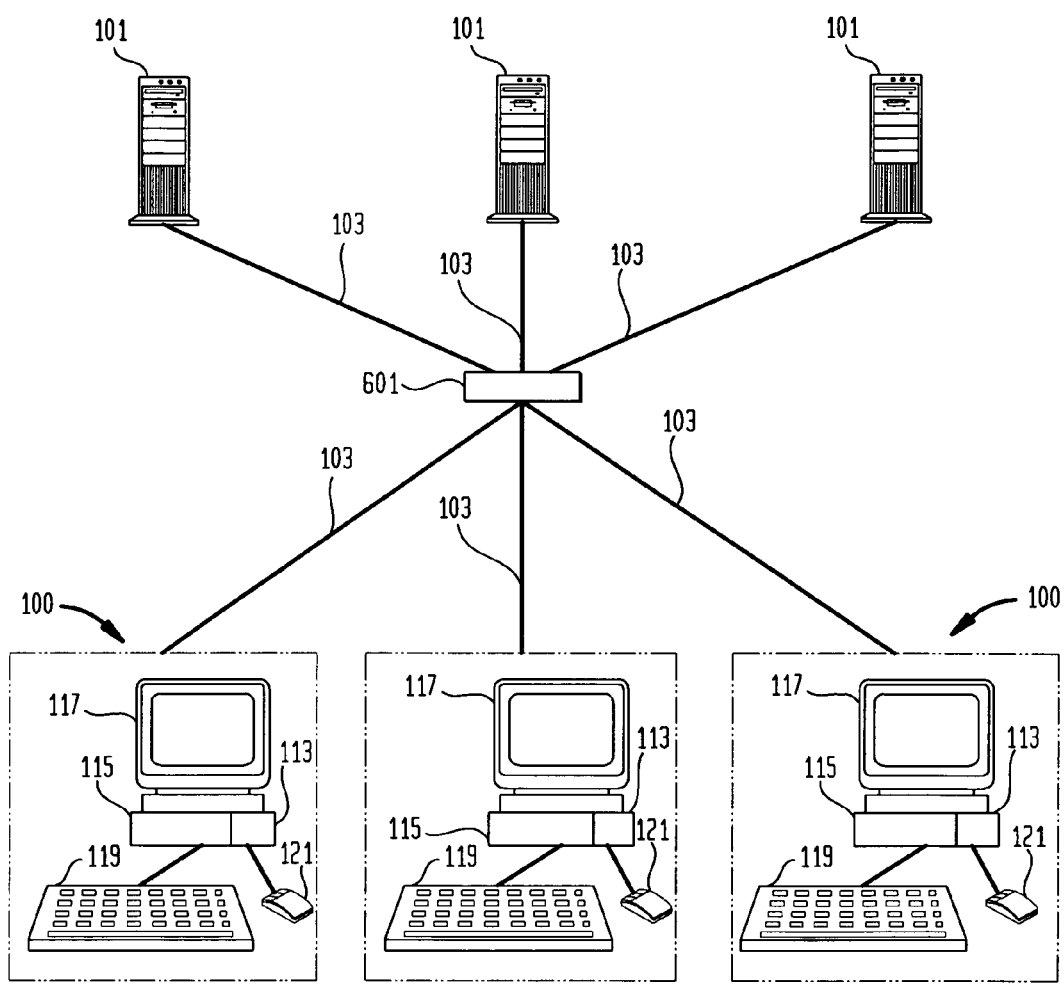
FIG. 6 is a schematic representation of the remote device management system according to an alternate embodiment of the present invention illustrating the connection of multiple remote devices to one composite WCIM, which communicates wirelessly to multiple WUSTs.

FIG. 6 is another embodiment of the present invention, in which multiple remote devices 101 are interfaced to one composite WCIM 601. Composite WCIM 601 is similar to WCIM 105, but with increased capabilities (e.g., additional KVM ports and additional wireless devices). Advantageously, composite WCIM 601 enables the present invention to connect multiple remote devices 101 with minimal hardware.

Figure 7:
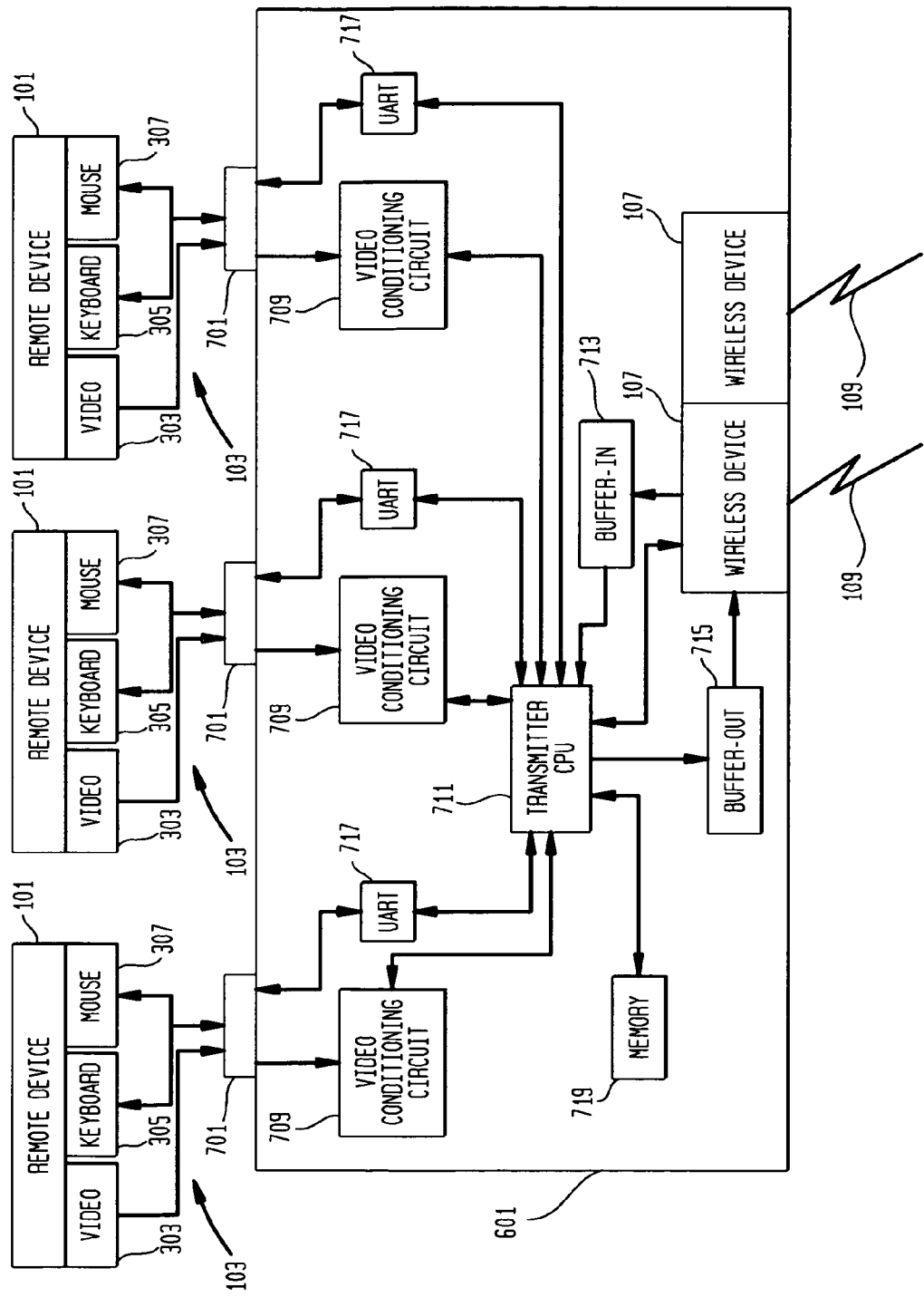
FIG. 7 is a schematic representation of the composite WCIM shown in FIG. 6 illustrating a block diagram of the internal structure of the composite WCIM and connectors for multiple keyboard ports, video monitor ports, and cursor control device ports.

Although the architecture of a composite WCIM 601 can vary, one example is shown in FIG. 7. Notably, composite WCIM 601 comprises similar components to WCIM 105 (FIG. 3), including WCIM CPU 711, buffer-in 713, buffer-out 715, and memory 719. To accommodate multiple remote devices 101 (three (3) are shown in FIG. 7, but more could be accommodated), composite WCIM 601 comprises multiple KVM ports 701, multiple UARTs 717 and multiple video conditioning circuits 709. WCIM CPU 711 must have the capability to receive input from multiple sources and memory 719 must be capable of storing identification information for each attached remote device 101. Finally, composite WCIM 601 may have multiple wireless devices 107 to increase available bandwidth for communication to WUSTs 115 (FIG. 1).

While the present invention has been described with reference to the preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A system for providing wireless monitoring and control of remote devices, said system comprising:
   at least one integrated wireless KVM switch;
   at least one user workstation comprising a keyboard, video monitor, and cursor control device, and wireless communication circuitry
   which communicates with said at least one integrated wireless KVM switch via a wireless network;
   a plurality of remote devices; and
   a plurality of wireless transceivers coupled to at least one of said remote devices through a KVM port of the wireless transceiver for receiving, compressing and converting video signals from said remote devices and for transmitting said compressed and converted video signals to said at least one integrated wireless KVM switch via a said wireless network;

wherein said at least one integrated wireless KVM switch bi-directionally communicates with said plurality of wireless transceivers and said at least one user workstation; and wherein said user workstation transmits keyboard and cursor control device data from said keyboard and cursor control device to said at least one integrated wireless KVM switch, and wherein the plurality of wireless transceivers receives keyboard and cursor control device packet data from the integrated wireless KVM switch and emulates keyboard and cursor control data for serial transmission to said plurality of remote devices through the KVM port.

2. A system according to claim 1, wherein said at least one user workstation includes circuitry for displaying a menu of said plurality of remote devices on said video monitor.

3. A system according to claim 2, wherein said menu provides access to and control of a select one of said plurality of remote devices.

4. A system according to claim 1, wherein said wireless network is an 802.11 wireless network.

5. A system according to claim 1, wherein said wireless network is an ad-hoc wireless network.

6. A system according to claim 1, wherein said wireless network is an infrastructure wireless network.

7. A system according to claim 1, wherein said plurality of wireless transceivers are powered by said plurality of remote devices.

8. A system for providing wireless monitoring and control of remote devices, said system comprising:

at least one user workstation comprising a keyboard, video monitor, cursor control device, wireless communication circuitry and video conditioning circuitry for decompressing video monitor data;

a plurality of remote devices; and a plurality of wireless transceivers having a KVM port and video conditioning circuitry for compressing video monitor data coupled to at least one of said remote devices through the KVM port for receiving, compressing and converting video signals from said remote devices and for transmitting said converted signals to said user workstation via a wireless network;

at least one integrated wireless KVM switch;

wherein said user workstation bi-directionally communicates with said plurality of wireless transceivers through said at least one integrated wireless KVM switch;

wherein said user workstation wirelessly transmits keyboard and cursor control device data packets from said keyboard and cursor control device to at least one of said wireless transceivers via said wireless network;

wherein said wireless transceivers generates emulated keyboard and cursor control device data based on the received keyboard and cursor control device data packets and serially transmits the emulated data to said plurality of remote devices through the KVM port and wherein said user workstation wirelessly receives video monitor data that has been compressed by said video conditioning circuit for compressing video monitor data from at least one of said wireless transceivers via said wireless network.

9. A system according to claim 8, wherein said at least one user workstation includes circuitry for displaying a menu of said plurality of remote devices on said video monitor.

10. A system according to claim 9, wherein said menu provides access to and control of a select one of said plurality of remote devices.

11. A system according to claim 8, wherein said wireless network is an 802.11 wireless network.

12. A system according to claim 8, wherein said wireless network is an ad-hoc wireless network.

13. A system according to claim 8, wherein said wireless network is an infrastructure wireless network.

14. A system according to claim 8, wherein said plurality of wireless transceivers are powered by said plurality of remote devices.

15. A method for wireless monitoring and control of remote devices, said method comprising the steps of:

displaying a menu of available remote devices at a user workstation;

requesting access to a select one of said available remote devices by clicking on a link corresponding to said select remote device;

transmitting a request to access said select remote device via a wireless network including an integrated wireless KVM switch;

packetzing keyboard and cursor control device signals for transmission to a wireless transceiver via said wireless network including an integrated wireless KVM switch;

emulating the keyboard and cursor control device data packets in the wireless transceiver;

serially transmitting the emulated data to the remote devices through a KVM port on the wireless transceiver;

receiving through the KVM port video signals from said select remote device;

converting and compressing the video signals from said select remote device; and transmitting said converted and compressed video signals to said user workstation via said wireless network including an integrated wireless KVM switch.

16. A method according to claim 15, further comprising the step of:

updating said menu of available remote devices as additional remote devices become available and as previously available remote devices become no longer available.

17. A method according to claim 15, wherein said wireless network is an 802.11 wireless network.

18. A method according to claim 15, wherein said wireless network is an ad-hoc wireless network.

19. A method according to claim 15, wherein said wireless network is an infrastructure wireless network.

* * * * *